US008960896B2

(12) United States Patent
Chou et al.

(10) Patent No.: US 8,960,896 B2
(45) Date of Patent: Feb. 24, 2015

(54) EYEGLASSES WITHOUT USING SCREWS

(71) Applicants: Hsien Chang Optical Industrial Co., Ltd., Tainan (TW); Jean Francois Laterre, Chaux Des Pres (FR)

(72) Inventors: Wen-Hsiung Chou, Tainan (TW); Jean Francois Laterre, Chaux Des Pres (FR)

(73) Assignees: Hsien Chang Optical Industrial Co., Ltd., Tainan (TW); Jean Francois Laterre, Chaux des Pres (FR)

( * ) Notice: Subject to any disclaimer, the term of this patent is extended or adjusted under 35 U.S.C. 154(b) by 281 days.

(21) Appl. No.: 13/690,416

(22) Filed: Nov. 30, 2012

(65) Prior Publication Data
US 2014/0152952 A1 Jun. 5, 2014

(51) Int. Cl.
*G02C 5/14* (2006.01)
*G02C 5/16* (2006.01)
*G02C 5/22* (2006.01)

(52) U.S. Cl.
CPC .................................... *G02C 5/2218* (2013.01)
USPC ............................ 351/116; 351/114; 351/153

(58) Field of Classification Search
USPC ................... 351/111, 114, 116, 121, 140, 153
See application file for complete search history.

(56) References Cited

U.S. PATENT DOCUMENTS 7,712,894 B2 * 5/2010 Tsai ................................ 351/97

* cited by examiner

*Primary Examiner* — Jack Dinh
(74) *Attorney, Agent, or Firm* — Rosenberg, Klein & Lee

(57) ABSTRACT

A pair of eyeglasses includes a frame having two rims with a bridge connected therebetween. Each rim has an installation hole and a groove is defined in the inner periphery of each of the installation holes. A reception portion is defined in the outside of each of the rims. Two lenses each have the inner end engaged with the groove and the outer end of each lens is located in the reception portion. A passage is defined through the distal end of each of the rims. An opening and an engaging hole are respectively defined through each of the rims and communicate the passage. The opening communicates with the reception portion. Two connection members are respectively inserted into the two passages and each connection member has a protrusion which extends through the opening and presses the lens. Each connection member has a resilient engaging portion engaged with the engaging hole.

3 Claims, 4 Drawing Sheets

EYEGLASSES WITHOUT USING SCREWS

BACKGROUND OF THE INVENTION

1. Field of the Invention

The present invention relates to a pair of eyeglasses, and more particularly, to a pair of eyeglasses without using screws to secure the lenses.

2. Description of Related Art

The conventional eyeglasses have different purposes such as the sunglasses and reading glasses, and the conventional eyeglasses generally comprise a front with two rims, and two temples are connected to the two rims respectively. The temples are connected to the rims by screws and each of the rims has a lens installed therein.

The lenses each are shaped to be matched with the installation holes of the two rims and the each rim has a connection portion which is connected to the temple by screws so that the lens is securely connected to the rim.

However, the size of the connection portion of the rim is small and the screws have to be small enough to be connected to the connection portion and the temple, so that the assembler has to take extra attention to secure the screws by a proper tool. In other words, the screws and the tool are specially designed and the tiny screws are easily loose.

The present invention intends to provide a pair of eyeglasses and the lenses are secured to the rims without using any screw.

SUMMARY OF THE INVENTION

The present invention relates to a pair of eyeglasses and comprises a frame having two rims with a bridge connected therebetween. Each rim has an installation hole and a groove is defined in the inner periphery of each of the installation holes. A recessed reception portion is defined in the outside of each of the rims. Two lenses are installed in the installation holes and each has an inner end engaged with the groove, and the outer end of each lens is located in the reception portion. A passage is defined through the distal end of each of the rims and an opening is defined through the distal end of each of the rims and communicates between the passage and the reception portion. An engaging hole is defined through the front wall of the distal end of each of the rims and communicates with the passage. Two connection members are respectively inserted into the two passages and each connection member has a protrusion which extends through the opening and presses the lens. Each connection member has a resilient engaging portion which is movably engaged with the engaging hole corresponding thereto.

Preferably, two temples are respectively connected to the two connection members.

Preferably, a resilient band is connected between the two connection members.

The primary object of the present invention is to provide a pair of eyeglasses and the lenses are secured to the frame without using screws.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
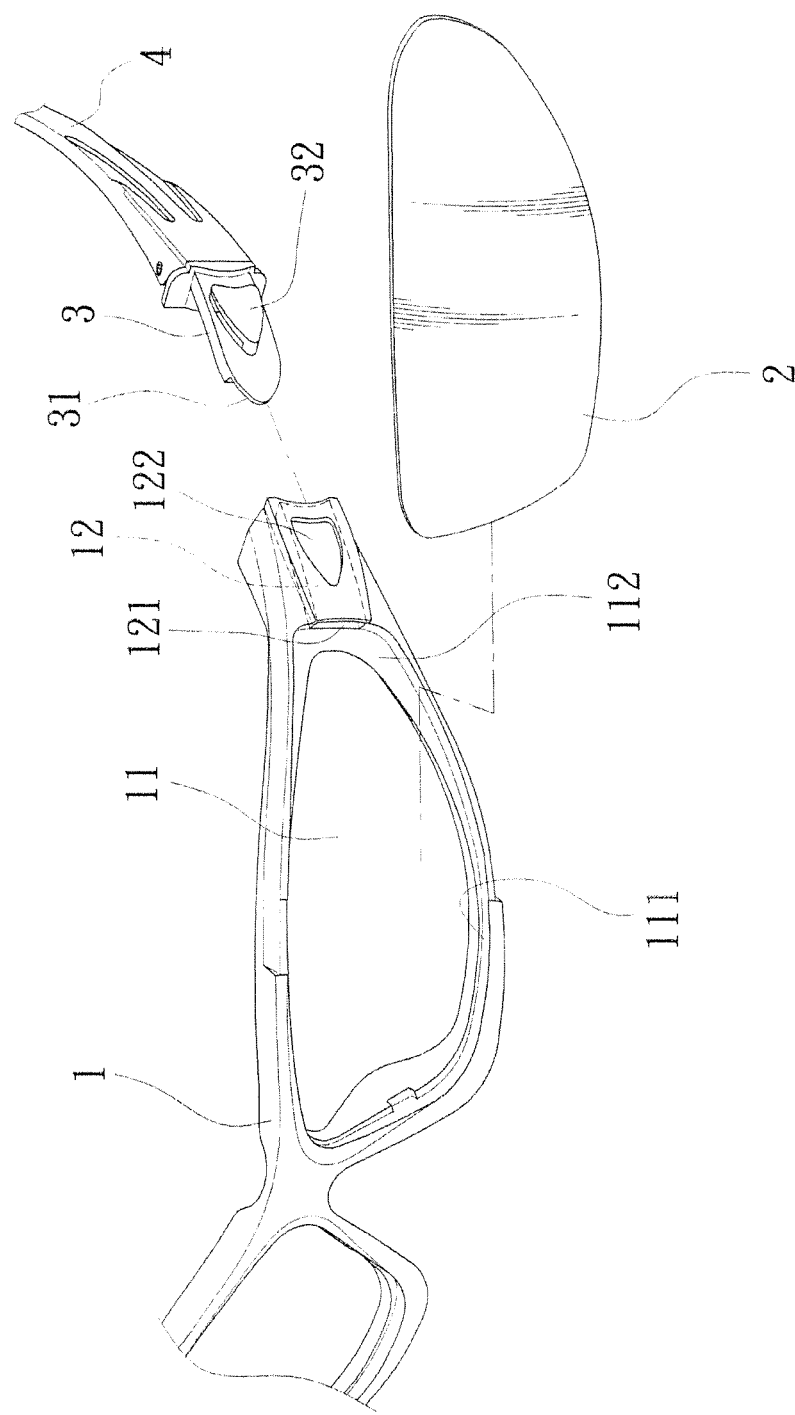
FIG. 1 is an exploded view to show the first embodiment of the eyeglasses of the present invention.
Figure 3:
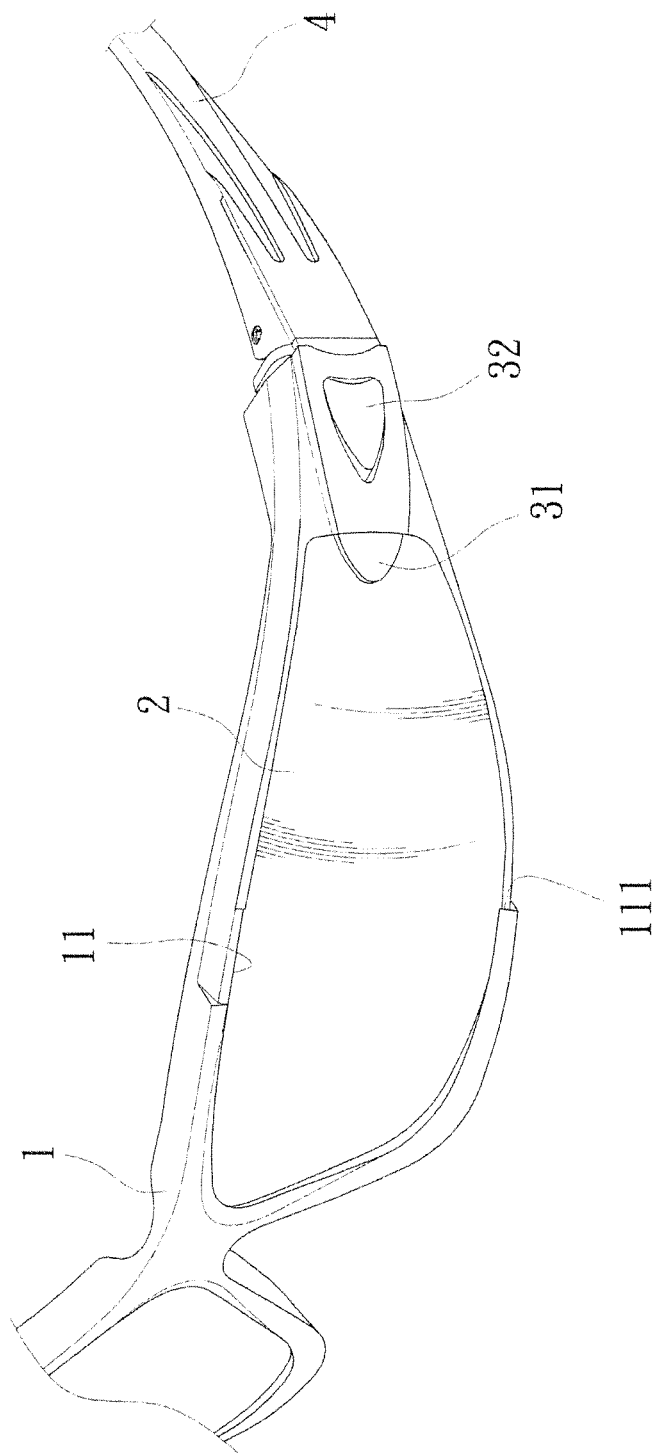
FIG. 3 is a perspective view to show the first embodiment of the eyeglasses of the present invention.
Figure 4:
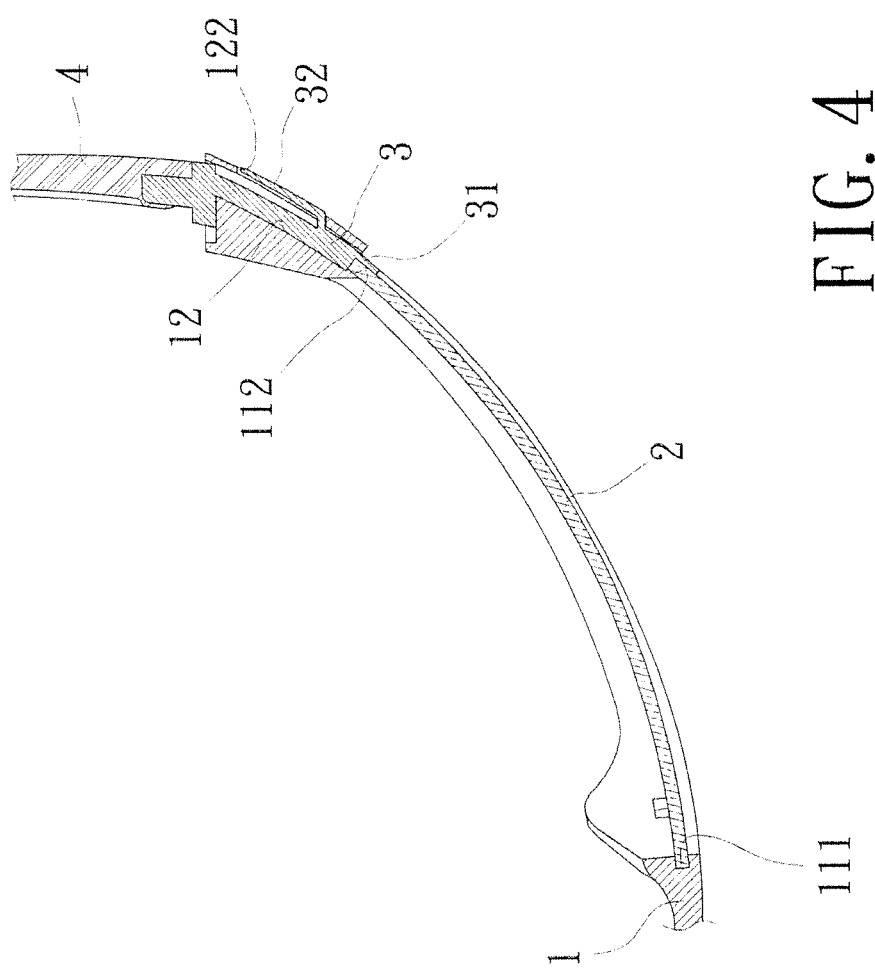
FIG. 4 is a cross sectional view to show the positioning of the lens of the eyeglasses of the present invention.

Referring to FIGS. 1, 3 and 4, the pair of the eyeglasses of the present invention comprises a frame 1, two lenses 2 and two connection members 3. The frame 1 has two rims and a bridge is connected between the two rims. Each rim has an installation hole 11 and a groove 111 is defined in the inner periphery of each of the installation holes 11. A recessed reception portion 112 is defined in the outside of each of the rims. A passage 12 is defined through the distal end of each of the rims. An opening 121 is defined through the distal end of each of the rims and communicates between the passage 12 and the reception portion 112. An engaging hole 122 is defined through the front wall of the distal end of each of the rims and communicates with the passage 12.

The two lenses 2 are respectively located in the installation holes 11 of the two rims. Each lens 2 has the inner end thereof engaged with the groove 111 of the rim corresponding thereto, and the outer end of each lens 2 is located in the reception portion 112.

The two connection members 3 are respectively connected to two temples 4 and the connection members 3 are inserted into the two passages 12. Each connection member 3 has a protrusion 31 which extends through the opening 121 and presses the lens 2 in the reception portion 112. Each connection member 3 has a resilient engaging portion 32 which is removably engaged with the engaging hole 122 corresponding thereto.

The lenses 2 are easily secured and installed to the installation holes 11 of the frame 1 by engaging the periphery of the lens 2 with the groove 111, and the outer end of each lens 2 is located in the reception portion 112. Each of the connection members 3 has a protrusion 31 which extends through the opening 121 so as to press the lens 2 in the reception portion 112. In order to further position the connection member 3, each connection member 3 has a resilient engaging portion 32 which is removably engaged with the engaging hole 122 corresponding thereto. It is noted that the lenses 2 are secured without using any tool and screw.

When replacing the lenses 2, the resilient engaging portions 32 are respectively pushed inward to remove the resilient engaging portions 32 from the engaging holes 122, the connection members 3 can be removed from the passages 12, and the lenses 2 can be replaced.

Figure 2:
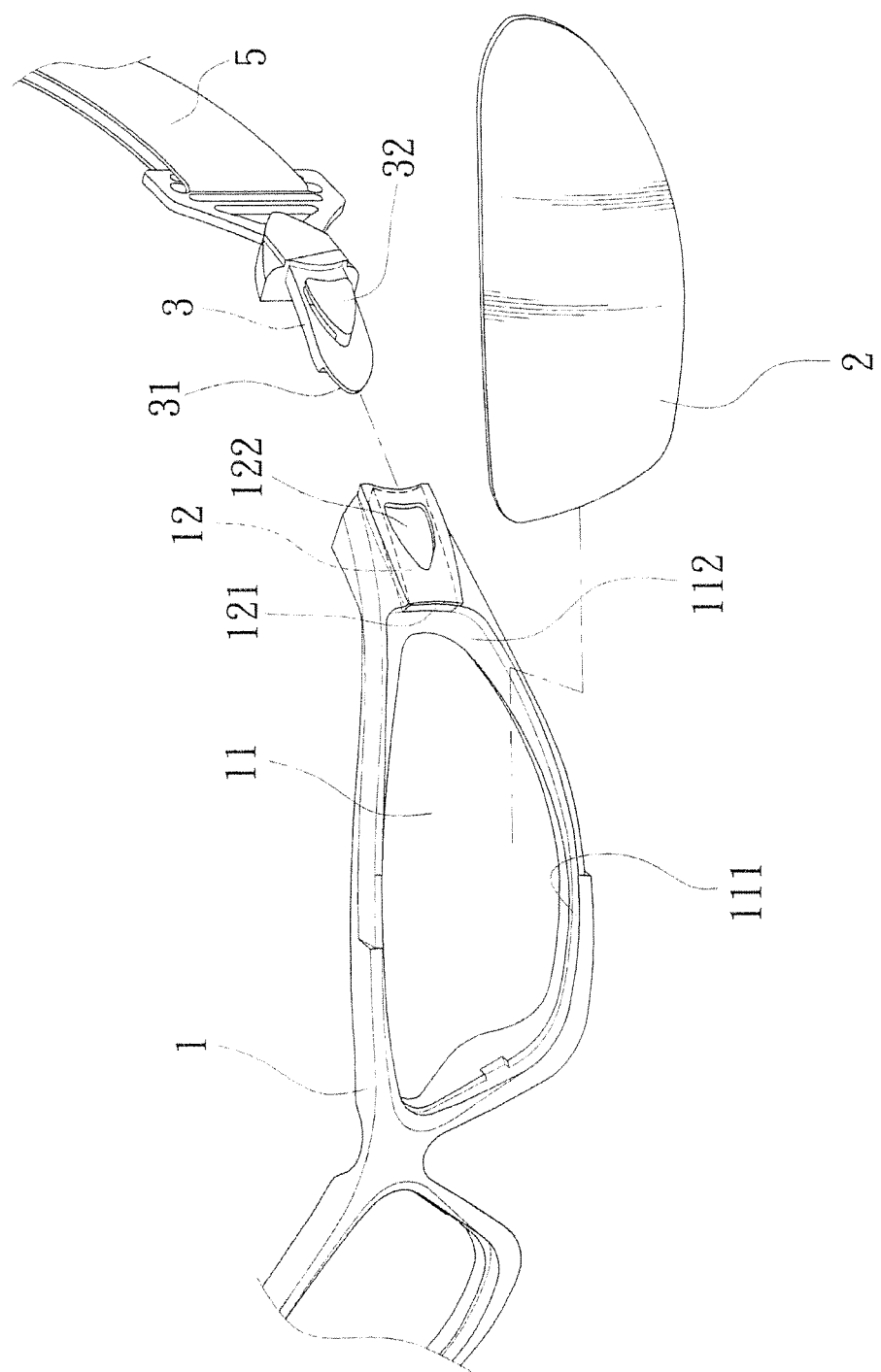
FIG. 2 is an exploded view to show the second embodiment of the eyeglasses of the present invention.

FIG. 2 shows the second embodiment of the eyeglasses of the present invention, wherein the temples 4 are replaced by a resilient band 5 whose tow ends are respectively connected to the two connection members 3.

While we have shown and described the embodiment in accordance with the present invention, it should be clear to those skilled in the art that further embodiments may be made without departing from the scope of the present invention.

What is claimed is:

1. A pair of eyeglasses comprising:
a frame having two rims and a bridge connected between the two rims, each rim having an installation hole, a groove defined in an inner periphery of each of the installation holes, a recessed reception portion defined in an outside of each of the rims, a passage defined through a distal end of each of the rims, an opening defined through the distal end of each of the rims and communicating between the passage and the reception portion, an engaging hole defined through a front wall of the distal end of each of the rims and communicating with the passage;

two lenses respectively located in the installation holes of the two rims, each lens having an inner end thereof engaged with the groove of the rim corresponding thereto, an outer end of each lens located in the reception portion, and two connection members respectively inserted into the two passages, each connection member having a protrusion which extends through the opening and presses the lens, each connection member having a resilient engaging portion which is removably engaged with the engaging hole corresponding thereto.

2. The eyeglasses as claimed in claim 1, wherein two temples are respectively connected to the two connection members.

3. The eyeglasses as claimed in claim 1, wherein a resilient band is connected between the two connection members.

* * * * *